(No Model.)  2 Sheets—Sheet 1.

S. M. BALZER.
DEVICE FOR MAKING CUTTERS.

No. 535,127.  Patented Mar. 5, 1895.

Witnesses  
Theodore Bourne  
R. J. Larson

Inventor  
S. M. Balzer  
By his Attorney  
T. F. Bourne (No Model.)  2 Sheets—Sheet 2.

S. M. BALZER.
DEVICE FOR MAKING CUTTERS.

No. 535,127. Patented Mar. 5, 1895.

Witnesses
Theodore Bourne
R. J. Larson

Inventor
S. M. Balzer
By his Attorney
J. F. Bourne

UNITED STATES PATENT OFFICE.

STEPHEN M. BALZER, OF NEW YORK, N. Y., ASSIGNOR OF ONE-HALF TO WILLIAM H. HUMPHREY, OF NORFOLK, CONNECTICUT.

DEVICE FOR MAKING CUTTERS.

SPECIFICATION forming part of Letters Patent No. 535,127, dated March 5, 1895.

Application filed May 14, 1894. Serial No. 511,090. (No model.)

*To all whom it may concern:*

Be it known that I, STEPHEN M. BALZER, a resident of the city, county, and State of New York, have invented an Improved Device for Making Cutters, of which the following is a specification.

The object of my invention is to provide a simple, cheap and effective device capable of use in an ordinary lathe by means of which milling-cutters or similar tools may be readily made.

The invention consists in a device having an intermittently rotative spindle or sleeve adapted to carry a cutter-blank in such position that it can be operated upon by a suitable tool carried by the tool rest of the lathe, whereby the teeth of the cutter can be formed and "backed-off," through the medium of the intermittent motion given to said spindle. The "backing-off" of the teeth of the cutter is accomplished through the medium of an eccentric motion given to said spindle during its rotation, so that the back of the teeth of the cutter will be operated on more fully than the forward cutting edge of said teeth.

The invention further consists in the combination with said intermittently rotative spindle or sleeve, of suitable gear wheels provided with differential gears and a pinion that meshes with said gears and is carried around by the face plate or equivalent part of the lathe, so that at certain times during the revolution of said pinion the gear wheel connected with said spindle or sleeve will be turned a distance equal to a few of its teeth, whereby the cutter-blank will be presented at different points to the cutting tool.

The invention also consists in the novel details of improvement and the combinations of parts that will be more fully hereinafter described and then pointed out in the claims.

Reference is to be had to the accompanying drawings forming parts hereof, wherein—

Figure 1:
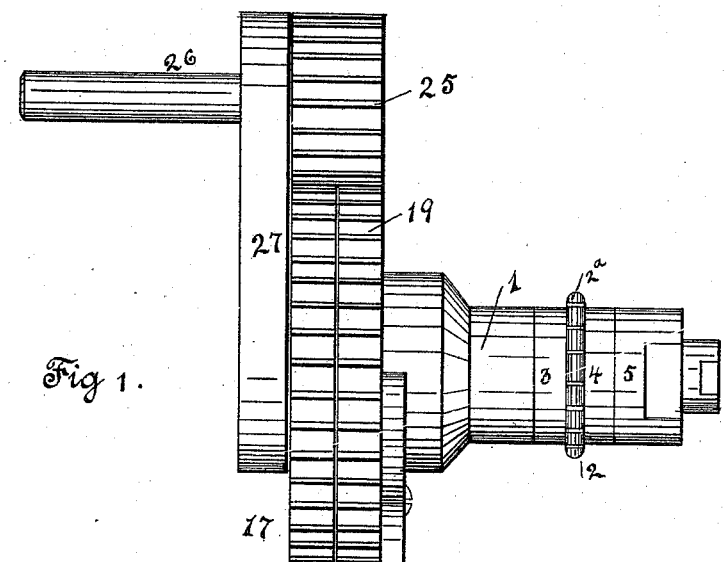
Figure 2:
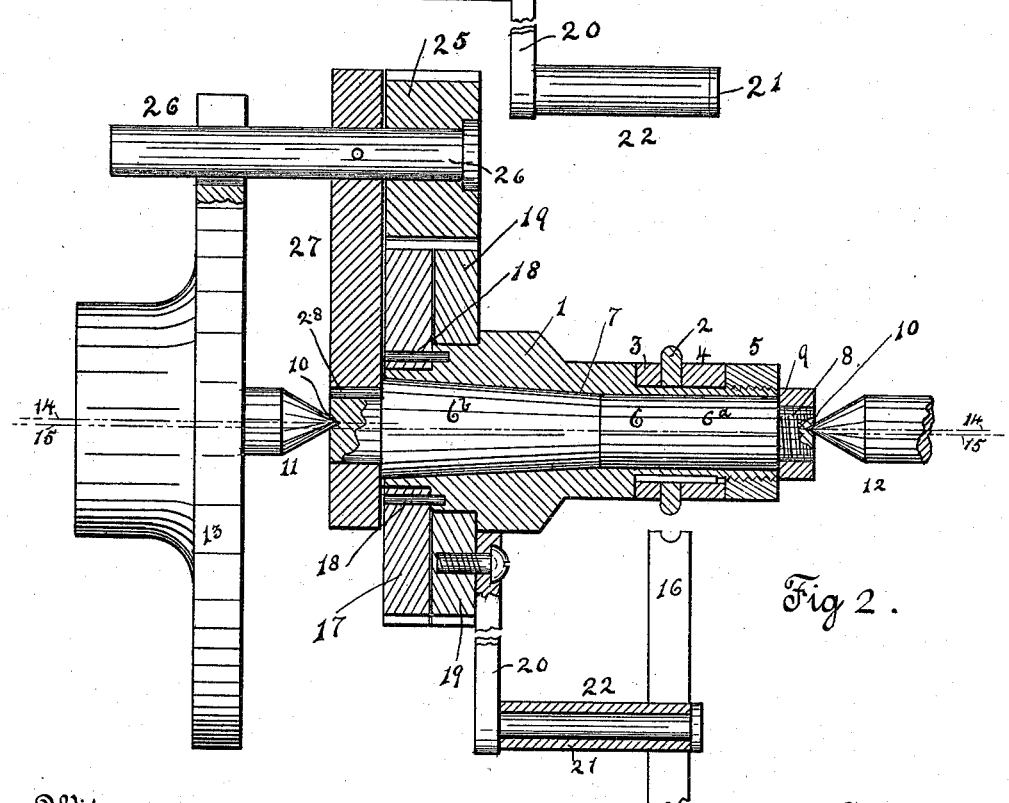
Figure 3:
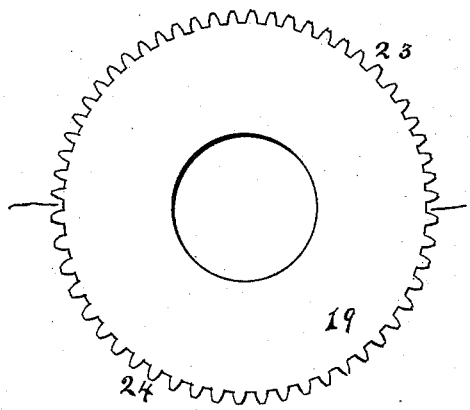
Figure 4:
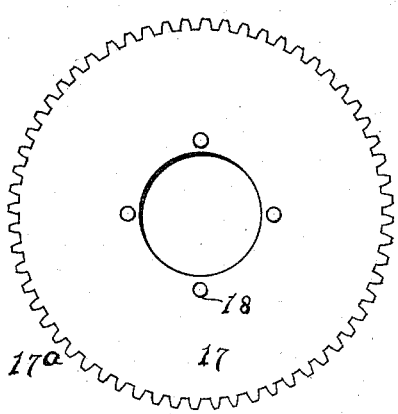
Figure 5:
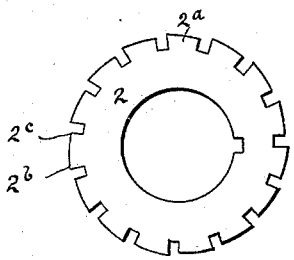

Figure 1 is a detail side elevation of my improved cutter-making device. Fig. 2 is a central longitudinal section thereof, showing it supported in position between the face plate and the tail stock of a lathe. Fig. 3 is a face view of the differential gear wheel. Fig. 4 is a similar view of the accompanying gear, having all its teeth corresponding, and Fig. 5 is a detail view of a cutter that may be produced by my improved device.

In the accompanying drawings, in which similar numerals of reference indicate corresponding parts in the several views, the numeral 1 indicates a hollow spindle or sleeve adapted to carry a cutter-blank 2. The spindle or sleeve 1 is shown reduced at one end to receive said cutter-blank and provided with clamping rings 3, 4, and a clamping nut 5, threaded on the spindle 1, so as to securely lock the cutter-blank upon said spindle. Before said cutter-blank is placed on the spindle 1, it will be suitably shaped and provided with the desired number of teeth $2^a$.

The spindle 1 is mounted to turn on a spindle 6, which is shown in Fig. 2 as passing through a bore 7 in the spindle or sleeve 1. The spindle 6 is shown at one part as having a straight surface $6^a$, and a tapered surface $6^b$, the bore 7 being correspondingly shaped to receive said spindle. By this means the spindle 1 is conveniently centered on the spindle 6 and held from endwise movement thereon. The outer end of the spindle 6 may be threaded at 8 to receive a nut 9, against which the outer end of the spindle or sleeve 1 may bear whereby said spindle may be held in proper relative position to cause the cutter-blank 2 to properly turn on the spindle 6. The ends of the spindle 6 are provided with recesses or sockets 10, to receive the centering spindles 11, 12, of the face plate 13, and tail stock, (not shown) respectively, of a lathe. The recesses or sockets 10 in the ends of the spindle 6 are placed eccentric to the longitudinal axis of said spindle, as seen by following the dotted line 14 in Fig. 2, the dotted line 15 indicating the true longitudinal axis of the spindle 6. By this means as the spindle 6 is turned it will move in an eccentric path described around the centering spindles 11, 12, by which means the cutter-blank 2 will be given a lateral motion, to be presented to the cutting tool 16; or in other words, the cutter-blank is moved toward and from the tool 16 in order that said tool may operate on the cutter-blank, in contradistinction to having the tool moved against the cutter blank. The tool 16 may be carried by a tool rest of the lathe, (not shown.)

The spindle or sleeve 1 and thereby the cutter-blank are given an intermittent rotary motion as follows:—17 is a spur wheel secured to the spindle or sleeve 1, as by locking pins 18, or otherwise, and 19 is another spur wheel, of the same diameter as the wheel 17, but mounted on the spindle 1 so that the latter can turn therein. The wheel 19 may be kept from turning by suitable means, an arm 20 being shown secured to said wheel and having an extension or pin 21, that may bear on the tool 16, or on any other part of the lathe or machine. The extension 21 is shown provided with a roller or sleeve 22 that may bear on the tool 16 to reduce friction as the arm 20 moves back and forth under the eccentric rotary motion of the spindle 6. The spur wheel 17 is shown provided with a series of teeth 17$^a$ all corresponding in pitch and size, sixty of said teeth being shown on said wheel. The wheel 19 has differential teeth, that is to say, for a part of the circumference of said wheel there are thirty teeth 23 corresponding to the teeth on wheel 17, and for the rest of the circumference of said wheel 19, there are twenty-six teeth 24, of a larger size or at a greater distance apart than the teeth 23. The wheels 17 and 19 are placed side by side so that their teeth can align as in Fig. 1.

25 is a pinion meshing with the teeth on wheels 17 and 19, and said pinion is shown journaled on a pivot pin 26, secured to an arm 27, that is rigidly carried by the spindle 6, being shown secured thereto by a pin 28. The pin 26 is adapted to engage the face plate 13 of the lathe, so that as said plate rotates the arm 27, and consequently the pinion 25, will be carried around. As the arm 27 is thus carried around the spindle 6 will be turned and in consequence of its eccentric bearing at 10, 11, 12, it will move in an eccentric path as before stated. As the pinion 25 is carried around by the arm 27, it will rotate on its pin 26, while it is in engagement with the teeth 17$^a$, on wheel 17 and teeth 23 on wheel 19, without causing said wheels to turn, but as soon as said pinion engages the teeth 24 on wheel 19, (being also in engagement with the teeth 17$^a$) it will cause the wheel 17 to turn a short distance consequent upon the difference between the quantity of the teeth 24 and 17$^a$, that are side by side, and the different spacing between the teeth 24 and 17$^a$. The intermittent motion given the wheel 17 is caused by the teeth of the pinion 25, as the latter is carried around by the arm 27, endeavoring to pass between the teeth 24 and 17$^a$, and as all of said teeth cannot be aligned simultaneously the teeth of the pinion 25 will press upon certain of the teeth of wheel 17, and thus cause said wheel to turn slightly. In the example shown, the wheel 17 will be turned a distance equal to four teeth 24, which will correspond to the size of a tooth 2$^a$, of cutter-blank 2, and when the pinion 25 has passed from the teeth 24, the wheel 17 and consequently the spindle 1 will come to rest until said pinion again encounters the teeth 24. Thus, for each revolution of the arm 27, the spindle 1 will be given a rotary movement equal to the size of a tooth 2$^a$ of cutter-blank 2, and during said turning of said spindle 1, the tool 16 will operate on a tooth 2$^a$, of the cutter-blank to cut it to the desired shape. In consequence of the eccentric motion of the spindle 1, (the lateral motion thus given said spindle,) the cutter will be brought to bear against the tool 16 and the tool 16 will thus act to cut the tooth 2$^a$, from the point 2$^b$ back toward the point 2$^c$, whereby the "backing-off" of the tooth 2$^a$ is accomplished. The eccentric or lateral movement of the cutter-blank 2 and the intermittent rotary motion thereof are so timed and proportioned, with relation to the position of the tool 16, that at about the moment the cutter-blank is to be turned it will also be moved toward and in contact with the tool 16, the movement of said blank gradually increasing under the eccentric action, to back off the teeth 2$^a$ of the cutter-blank. When the tooth 2$^a$ has passed from the tool 16 it will come to rest to enable it to recede from the tool so that the front edge 2$^b$, of the tooth 2$^a$, of the cutter will clear the tool 16 when the cutter-blank next turns, yet will engage the tool at the desired point to cut or back off the teeth 2$^a$.

The tool 16 will of course be given the desired shape to produce the desired shape of tooth 2$^a$.

The amount of movement given the cutter-blank 2 for each intermittent rotary action will be governed by the difference in ratio between teeth 23 and 24 on wheel 19.

The cutter-blank 2 will be given more or less movement for each intermittent movement according to the number of its teeth. Thus, by dividing the number of teeth on wheel 17, by the number of teeth on the cutter-blank, the quotient will show the number of teeth to deduct from the part of wheel 19 having teeth 24. Thus, in the example shown the wheel 17 has sixty teeth and the cutter-blank 2 has fifteen teeth, the quotient, therefore, being 4 shows how many teeth to eliminate from the part of wheel 19 having teeth 24. Thus, there are used twenty-six teeth, 24, the number of teeth 23 corresponding to the teeth 17$^a$ where they align.

The device will be found simple in construction, rapid in operation and effective in use. The cutter-blank 2 can be cut to shape and "backed-off" by my device in a very short time, as the action is continuous and automatic.

Having now described my invention, what I claim is—

1. In a cutter making device, a rotative spindle or sleeve having eccentric motion, and means for imparting to said spindle or sleeve an intermittent rotary motion, substantially as described.

2. In a cutter making device, a rotative spindle or sleeve having means to carry a cutter-blank, means for giving said spindle or sleeve an eccentric motion, and means for intermittently rotating said spindle or sleeve, substantially as described.

3. In a cutter making device, an eccentrically supported rotative spindle, a hollow spindle or sleeve mounted thereon, and means for giving said hollow spindle or sleeve an intermittent rotary motion, substantially as described.

4. In a cutter making device, an eccentrically rotative spindle, a hollow spindle or sleeve mounted thereon, and differential gears for giving said hollow spindle or sleeve an intermittent rotary motion, substantially as described.

5. In a cutter making device, the combination of a spindle adapted to carry a cutter-blank, a stationary differential gear wheel, another gear wheel connected with said spindle and having an even series of teeth, and a pinion meshing with both of said gear wheels and adapted to be carried around said wheels to give an intermittent rotary motion to said spindle, substantially as described.

6. In a cutter making device, the combination of a spindle adapted to be turned eccentrically, a hollow spindle or sleeve mounted thereon, a gear wheel connected with said hollow spindle or sleeve, another gear wheel loosely mounted on said hollow spindle or sleeve, said gear wheels having differential teeth, an arm carried by said eccentric spindle, and a pinion carried by said arm and meshing with said gear wheels, and adapted to move said hollow spindle or sleeve intermittently as it is carried around said wheels, substantially as described.

7. In a cutter making device, the combination of a spindle having eccentric bearings, an arm connected therewith, and a pinion carried by said arm, said arm being adapted to be turned by the face-plate of a lathe, with a hollow spindle or sleeve mounted on said eccentric spindle, a gear wheel carried by said hollow spindle or sleeve, a differential gear wheel loosely mounted on said hollow spindle or sleeve and means for holding said differential gear wheel from turning, said pinion meshing with said gear wheels, substantially as described.

8. In a cutter making device, an eccentrically rotative spindle having a straight portion and a tapered portion, combined with a hollow spindle or sleeve having a bore corresponding to the circumference of said eccentric spindle, and differential gearing for rotating said hollow spindle or sleeve intermittently, substantially as described.

9. In a cutter making device, an eccentrically rotative spindle having a tapered portion, combined with a hollow spindle or sleeve having a corresponding taper in its bore, an adjusting nut on said eccentric spindle for holding the hollow spindle or sleeve in position, and differential gearing for giving said hollow spindle or sleeve an intermittent rotary motion, substantially as described.

10. In a cutter making device, the combination of an eccentrically rotative spindle carrying an arm, with a hollow spindle or sleeve mounted to turn on said eccentric spindle, a gear wheel connected with said hollow spindle or sleeve, a differential gear wheel loosely mounted on said hollow spindle or sleeve, an arm projecting from said differential gear wheel, a roller 22 carried by said arm to engage a tool, a pivot pin carried by the first mentioned arm and adapted to engage the face-plate of a lathe, and a pinion carried by said pivot and meshing with the said gear-wheels, all arranged for operation, substantially as set forth.

STEPHEN M. BALZER.

Witnesses:
 T. F. BOURNE,
 THEODORE BOURNE.